US007316017B1

(12) United States Patent
Jacobson et al.

(10) Patent No.: US 7,316,017 B1
(45) Date of Patent: Jan. 1, 2008

(54) SYSTEM AND METHOD FOR ALLOCATIING COMMUNICATIONS TO PROCESSORS AND RESCHEDULING PROCESSES IN A MULTIPROCESSOR SYSTEM

(75) Inventors: Van Jacobson, Woodside, CA (US); Bob Felderman, Portola Valley, CA (US); Archibald L Cobbs, San Carlos, CA (US); Martin Eberhard, Woodside, CA (US)

(73) Assignee: SLT Logic, LLC, Boston, MA (US)

( * ) Notice: Subject to any disclaimer, the term of this patent is extended or adjusted under 35 U.S.C. 154(b) by 766 days.

(21) Appl. No.: 10/337,176

(22) Filed: Jan. 6, 2003

(51) Int. Cl.
*G06F 9/46* (2006.01)
(52) U.S. Cl. .................. 718/102; 710/264; 719/313
(58) Field of Classification Search ................ 709/250; 710/260–264; 718/102–103; 719/313, 318
See application file for complete search history.

(56) References Cited

U.S. PATENT DOCUMENTS

| 5,379,434 | A | * | 1/1995 | DiBrino | 710/264 |
|---|---|---|---|---|---|
| 5,452,452 | A | * | 9/1995 | Gaetner et al. | 718/103 |
| 5,922,057 | A | * | 7/1999 | Holt | 710/52 |
| 6,370,657 | B1 | * | 4/2002 | Jansen et al. | 714/23 |
| 6,412,026 | B1 | * | 6/2002 | Graf | 710/18 |
| 6,636,928 | B1 | * | 10/2003 | Brooks | 710/310 |
| 6,941,308 | B1 | * | 9/2005 | Chilton | 707/100 |
| 6,973,521 | B1 | * | 12/2005 | Indiresan et al. | 710/200 |
| 6,993,762 | B1 | * | 1/2006 | Pierre | 718/102 |
| 7,089,404 | B1 | * | 8/2006 | Rozas et al. | 712/217 |
| 2004/0117598 | A1 | * | 6/2004 | Arimilli et al. | 712/30 |

OTHER PUBLICATIONS

Salim, Jamal H., Robert Olsson, Alexey Kuznetsov. "Beyond Softner". *Proceedings of the 5th Annual Linux Showcase & Conference.* Nov. 5-10, 2001. pp. 165-172. Oakland, CA.

* cited by examiner

*Primary Examiner*—Moustafa Meky
(74) *Attorney, Agent, or Firm*—Patterson, Thuente, Skaar & Christensen, PA

(57) ABSTRACT

In a multiprocessor system, a system and method assigns communications to processors, processes, or subsets of types of communications to be processed by a specific processor without using a locking mechanism specific to the resources required for assignment. The system and method can reschedule processes to run on the processor on which the assignment is made.

4 Claims, 5 Drawing Sheets

SYSTEM AND METHOD FOR ALLOCATIING COMMUNICATIONS TO PROCESSORS AND RESCHEDULING PROCESSES IN A MULTIPROCESSOR SYSTEM

FIELD OF THE INVENTION

The present invention is related to computer software and more specifically to computer software for processing communications received by a multiprocessor computer system.

BACKGROUND OF THE INVENTION

Computer systems can process communications from sources and provide responses. In a multiprocessor system, one or more network interface cards (NICs) receive communications, and drive an interrupt signal to one or more of the processors to indicate that a communication has been received. The interrupt resolution system in the computer system allows a driver in one of the processors to respond to the interrupt, so that the communication can be processed and a response may be generated. Because the processors may share the processing of interrupts, the processor containing the driver that responds to the interrupt for a communication received from one source may not be the processor that had responded to the interrupt for a prior communication received from that same source.

If the process that ultimately processes the communication requires state information from a prior communication, in the event that the same processor processed the prior communication, the state information may be in the processor's cache. The processing of the communication and the generation of the response in this event is quick and efficient, although in an n-multiprocessor system, such efficient processing may only occur 1/n of the time. The remainder of the time, the prior command was processed by a different process or on a different processor, and so the current state information from the prior communications will not be in the cache of the processor that processes the current communication. If, however, a different one of the processors processed the prior communication, the processor responding to the interrupt and processing the subsequent communication must retrieve the state information from memory or disk, adding time to process the communication and produce a response and reducing the throughput of the system. Such inefficient processing occurs (n−1)/n of the time. As n grows to a larger number, the processing efficiency of the system decreases and the average response time increases.

Other systems have the potential to improve the efficiency and response time of such systems, but can require complex contention management systems for the routing of messages to prevent the simultaneous access of queues or other resources by different processors, and if the other systems are implemented in hardware, can add hardware costs to the multiprocessor system.

What is needed is a system and method that can speed the processing and response to communications in a multiprocessor system without requiring any additional contention management systems and without adding hardware costs to the system.

SUMMARY OF INVENTION

A system and method uses a set of criteria and/or rules to assign communications to a processor, a process, or a type of communications on a processor, in a multiprocessor system. The criteria and/or rules may be preloaded at system startup, received from one or more processes during system operation, or both. The criteria and/or rules help ensure that any context information from prior communications that may be useful in processing the communication will be in the processor cache of the processor that processes each communication, speeding the processing of that communication without a special contention management system.

Because the processor that assigns the communication will already have the communication in its cache, if processing of the communication can be performed faster by causing a process capable of processing the communication to be run on the processor assigning the communication, the system and method directs the operating system to reschedule the process to run on that processor and then assigns the communication to that processor, and optionally to that process or type.

DETAILED DESCRIPTION OF A PREFERRED EMBODIMENT

Figure 1:
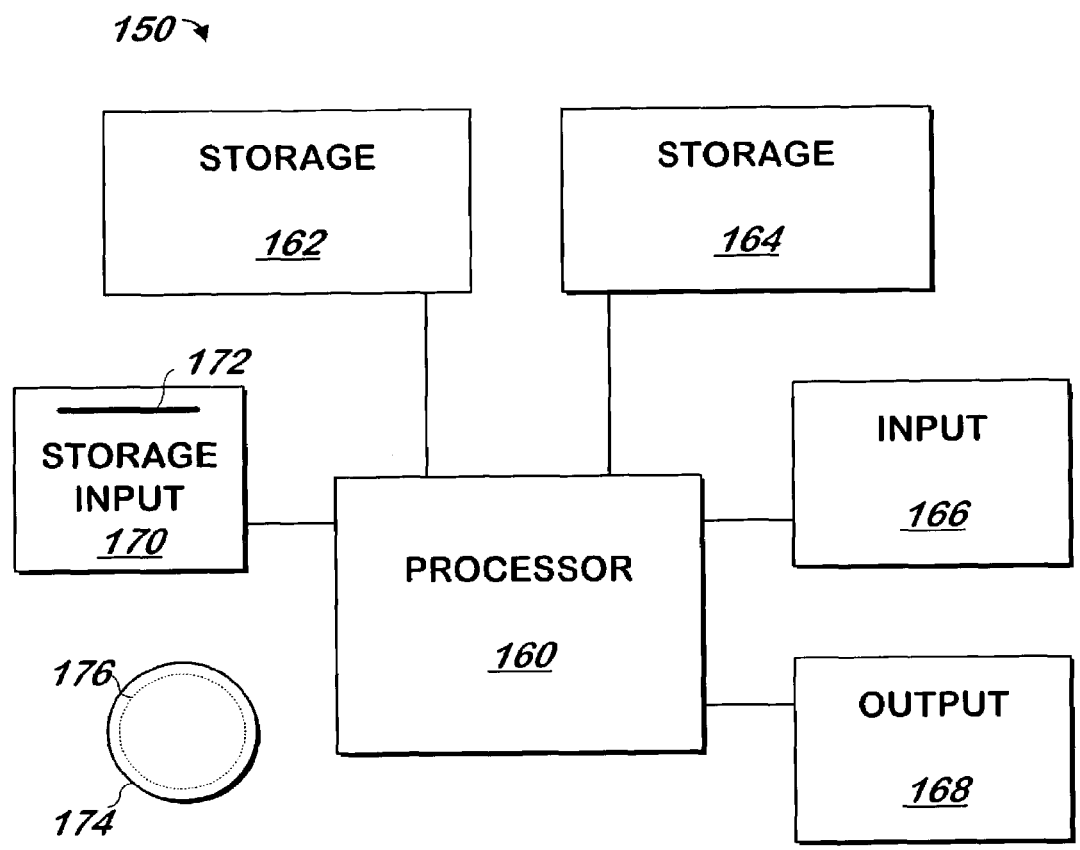
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2A:
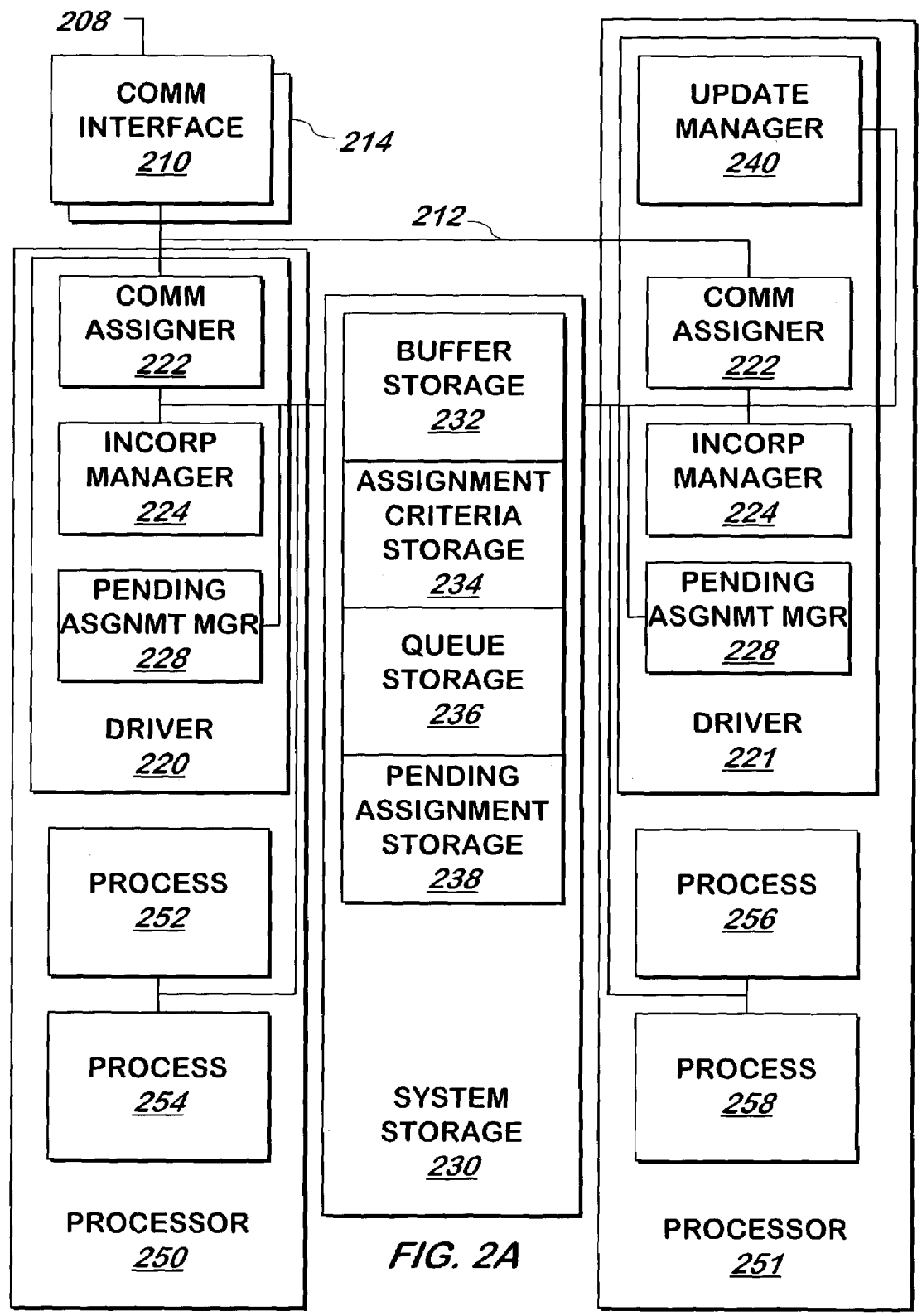
FIG. 2A is a block schematic diagram of a system for assigning communications in a multiprocessor system according to one embodiment of the present invention.

Referring now to FIG. 2A a block schematic diagram of system for assigning communications in a multiprocessor system is shown according to one embodiment of the present invention. In one embodiment, all communication into or out of system 200 is made via input/output 208 of communication interface 210 which is coupled to a network such as the Internet or a local area network or both. Communication interface 210 is a conventional communication interface that supports TCP/IP or other conventional communication protocols.

A Communication is Received and Stored.

A communication is received by communication interface 210 and communication interface 210 stores the communication in a buffer in buffer storage 232. In one embodiment, buffer storage 232 is part of system storage 230, which is conventional disk storage or memory, and each buffer contains sufficient space to hold the largest possible communication that may be received. When communication interface 210 has completed storing the communication to a buffer in buffer storage 232, communication interface 210 places the address or index of the buffer into which the communication was stored into a specified storage location or queue, such as a storage location or queue within the address space of the communication interface 210 itself, and signals an interrupt on interrupt line 212. Processors 250-251 monitor the interrupt line 212, and one of the processors will be chosen to handle the interrupt, using any conventional multiprocessor interrupt processor selection technique, such as are described in U.S. Pat. No. 5,379,434 issued to DiBrino on Jan. 3, 1995. Two processors 250-251 are shown in FIG. 2, however, any number of processors in a multiprocssor system may be used by the present invention.

Each processor 250-251 contains a driver 220-221 to handle the interrupt. The processor 250-251 that responds to the interrupt does so by transferring control to the driver 220-221 on that processor. Each processor 250-251 also runs any number of processes 252-258 that receive and process communications, four such processes 252-258 being shown in the figure, two for each processor 250-251, although any number of processes may be used and the number of processes need not be the same for each processor 250-251. The processes 252-258 can be any conventional process, such as application programs and any other process capable of processing a received communication.

Communication Identifier Identifies the Entity to which the Communication should be Assigned Communication assigner 222 in the driver 220-221 that handles the interrupt, identifies the entity, such as a processor 250, 251, to which the communication should be assigned. In one embodiment communication assigner 222 can not only identify as the entity to which the communication should be assigned as a processor 250-251, but also may identify as the entity a process 252-258 on that processor 250-251, or identifies as the entity a type (corresponding to a type queue described below) of communications to be processed by the identified processor 250-251 as described in more detail below. The identification and subsequent assignment of a communication to a processor 250, 251, and optionally a specific process 252-258 or type, may be performed in any number of ways, some of which will now be described.

In one embodiment, to make the identification, communication assigner 222 retrieves from communication interface 210 the address or index of the buffer into which the communication was stored, reads from buffer storage 232 some or all of the header, or other portion, or all, of the communication using the address or index of the buffer it retrieves, and identifies a corresponding processor 250-251 and/or optionally, a process 252-258 or a type of communications to be processed by a processor 250-251, by performing a function on some or all of the bits in the header of the communication.

For example, if the communication is a TCP packet, communication assigner 222 may use the least significant bit of the destination IP address from the header of the communication as the most significant bit of a two-bit result and use the least significant bit of the destination port of the header of the communication as the least significant bit of the result, and then identify a process 252-258 to which the communication should be assigned based on the result. For example, if the result is 00, process 252 is identified as the entity to which the communication should be assigned, if the result is 01, process 254 is identified as the entity to which the communication should be assigned, if the result is 10, process 256 is identified as the entity to which the communication should be assigned, and if the result is 11, process 258 is identified as the entity to which the communication should be assigned.

A similar technique may be used to assign communications to processors 250-251 if it is not desirable to assign communications directly to processes. This may be because there are multiple processes on the same processor that can process a given communication, and pooling such communications for processing by any capable process can ensure that they are processed in a manner that more closely corresponds to the order in which they are received, while ensuring that any such process has access to the context information in the processor cache from processing prior communications. This can also allow the processes to retrieve communications using conventional operating system calls, provided that the communications identified for each processor are placed into a data structure compatible with the operating system. As an example of the manner in which a processor may be identified as the entity to which the communication is assigned, the two bits in the result described above may be exclusive-ored, and if result of the exclusive-or is 1, processor 250 is identified as the entity to which the communication should be assigned and if the result of the exclusive-or is 0, processor 251 is identified as the entity to which the communication should be assigned.

A similar technique may be used to identify communications as a type of communications to be processed by a given processor. The identification, and subsequent assignment of a communication to a type of communications to be processed by a certain processor allows assignment to processes that can process that type of communication, without assigning the communication to a specific process, so that it may be processed more closely to the order in which it was received. In addition, as described in more detail below, a process on a processor that processes communications of a given type may retrieve such communications directly from the data structure for that type and processor, without an intervening process or operating system to distribute communications to those processes that can process them. In the example above, if the result is 00, the communication is identified as being a first type on processor 250, if the result is 01, the communication is identified as being a second type on processor 250, if the result is 10, the communication is identified as being a first type on processor 251, and if the result is 11, the communication is identified as being a second type on processor 251. As described in more detail below, each type and processor has its own queue, and so the entity identified as the entity to which the communication should be assigned is the queue corresponding to the type and processor.

The above were representative functions used to identify as the entity to which the communication should be assigned as a process, processor or queue for a type of communication to be processed by a certain processor. However, in other embodiments, other functions of arbitrary complexity may be used on any portion of the header to assign the communication. For example, a hash function on any or all of the source and destination IP addresses and ports and the protocol may be used in place of assignment of bits as described above. The contents of the message may be used for the function and other information other than the TCP header, such as an IP header, or even the time of day or a random number or pseudo-random number may be used to identify the entity to use for assignment of the communication.

In other embodiments of the present invention, lookup tables and the like may be used in place of the function, or in addition to it. In one embodiment, the lookup table may be pre-stored in processor identifier storage 234. Each row in the lookup table may contain a criteria (for example source IP address and port, followed by destination address and port, followed by protocol, with don't care symbols as wildcards) that, can be compared to some or all of the communication or other information (e.g. date and time) to determine whether the communication corresponds to that row in the lookup table. Other information in each row of the lookup table can be used to identify a process, processor or type of communication to be processed by a processor, to which the communication should be assigned when the communication corresponds to the criteria in the row. For example, an identifier of a queue in queue storage (described below) corresponding to the processor, process or type queue in queue storage 236 (described below) to which the communication should be assigned if it corresponds to the criteria of the row may be stored as another column of the table. The lookup table may be supplied prefilled, read into assignment criteria storage 234 from a file at system startup by update manager 240, or may be filled in response to messages received from processes 252-258 or other processes as described in more detail below. Because the drivers 220-221 respond to interrupts, only one driver 220-221 will access the lookup table in assignment criteria storage 234 at a given time, and thus, drivers 220-221 may share a single lookup table, although in other embodiments, each driver 220-221 has its own lookup table, which may be a copy of the others, or may contain differences representing the preference for assigning communications to the processor 250-251 on which the driver 220-221 executes as described below.

Resolution Between Conflicting Entities

More complex functions may be performed on the communications received than those described above, some of which may not be mutually exclusive, or the criteria in the table entries may overlap. In such embodiment, the communication being assigned in the manner described herein may meet the criteria for any of several rows in the table.

In one such embodiment, communication assigner 222 may use an internally stored set of rules, such as to prefer assignment to the processor 250-251 on which the communication assigner 222 making the assignment runs, and to prefer assignment corresponding to a specific process 252-258 ahead of assignment for a type of communication, and to prefer such assignment for a type of communication ahead of assignment for the processor 250-251. To allow such preferences to be expressed, the type of entity to which the communication corresponding to the criteria will be assigned is stored with the criteria in assignment criteria storage 234 or it may be implied from the identifier of the queue to which the communication should be assigned. In one embodiment, ranges of process identifiers capable of being assigned to processes running on each processor 250-251 and identifiers of the processors 250-251 themselves may be stored in assignment criteria storage, and the table rows reference the processor identifiers and/or process identifiers to allow communication assigner 222 (which internally stores the identifier of the processor 250-251 on which it operates as described below) to assign communications in accordance with these internally stored preference rules. Each row in the table in assignment criteria storage 234 may contain a preference field that communication assigner 222 can use to resolve the criteria for multiple rows matching a communication. Remaining ties may be broken at random, round robin, or other conventional ways of breaking ties.

Assigning the Communication to a Queue Corresponding to the Entity Identified

After the assignment identification is made by communication assigner 222 as described above, in one embodiment, communication assigner 222 assigns the communication to a queue or other storage in queue storage 236 that corresponds to the entity identified. To assign a communication to a processor, a type of communications within a processor, or a process on a processor, the pointer to the communication is provided to the end of a corresponding queue in queue storage 236, which is a part of system storage 230. Queue storage 236, described in more detail below, contains queues for each processor in one embodiment, each process in another embodiment, or for each type of communication for a given processor, in still another embodiment. Another embodiment may employ any combination of these, for example, having one queue per process, and a queue for the processor to handle communications that do not meet the criteria for assignment to a particular process.

In one embodiment, queue storage 236 is composed of several queues. The head pointer and tail pointer for each queue is stored in one part of queue storage 236 and the contents of each queue are stored in a different part of queue storage 236. The pointers for queues of each type (e.g. process queues, processor queues and queues for communications designated as being of a certain type to be processed on a certain processor) can be stored together in a logical order such as the order of the identifier of the process, processor or type, so that an offset corresponding to the queue can be identified from the process, processor or type to which the communication should be assigned, identified as described above.

The offset from a base address of the queue into which the communication matching the criteria should be stored, is stored in the table entry or may be calculated using the result of the function. The address or offset may be a function of the type of queue (e.g. processes have one base address, processors have another and types of communications assigned to a processor have another base address). In the case of a processor or process, the identifier of the processor and process may be used to calculate the offset (e.g. every queue has two words: a head pointer and a tail pointer, and therefore, the address of the queue for processor 3 is the base address for processor queues+6 words). In the case of types, a type identifier may be provided by the application with the criteria, and the type identifier is used to calculate the offset in the manner described above for the processor identifier. In other embodiments, pending assignment manager 228 may provide the base address and offset from a base address for an unused queue that corresponds to the criteria received, in response to receipt of the criteria.

The address of the queue contains a head pointer and a tail pointer of the queue. Storage for the contents of the queue is also located in queue storage 236 at another location, with sufficient space for each queue based on the expected traffic for the type of queue or the various types of queues.

Although the description above describes the identification of the entity to which the communication should be assigned, and then the assignment of the communication to a queue corresponding to that entity, in one embodiment, the identification of the entity may be performed by identifying the queue corresponding to the entity. In such embodiment, the actual identity of the entity that corresponds to the queue need not be "known", as the queue acts as a surrogate for an identifier of the entity.

Processes can Control the Identification and Assignment Process by Supplying Rows to be Incorporated into the Table In one embodiment, each process 252-258 may instruct pending assignment manager 228 that it desires to handle communications meeting a certain criteria. For example, a process 252-258 may instruct pending assignment manager 228 in the driver 220-221 for the processor 250-251 on which the process 252-258 is running that it wishes to handle communications having a particular destination port and protocol by providing this criteria (for example, using the format of the criteria column of the table described above) and the identifier of the process, and an optional preference value as described above. Alternatively, a representative process 252-258 of a processor 250-251 may provide multiple rows of the table on behalf of other processes 252-258 running on that processor 250-251 to pending assignment manager 228 on the same processor 250-251 as the process supplying the information.

Pending assignment manager 228 stores the information at the end of a pending assignment criteria queue for that driver 220-221 in pending assignment storage 238, which contains one such queue for each driver 220-221. Because the processes 252-258 can provide this information at any time, including having one process 252-258 on each different processor 250-251 send such information simultaneously, the use of separate driver queues eliminates the requirement of a locking mechanism that would otherwise be required to prevent the simultaneous use of assignment criteria storage 234.

In one embodiment, a separate queue exists in pending assignment storage 238 for each process 252-258 or for each process 252-258 that may provide such information to pending assignment manager 228 to avoid locking requirements that could otherwise be necessary for the per-driver queues described above, to account for scheduling conflicts that could occur if another process interrupts the storage of the information into the per-driver queue. A locking mechanism may also be employed on the pending assignment criteria queue on the assumption that such a mechanism will not cause delays too frequently.

The information in pending assignment storage 238 may be transferred into assignment criteria storage 234 at a later time, in any of a number of different ways. In one embodiment, update manager 240 periodically halts the operation of drivers 220-221 to add the entries in all of the queues in pending assignment storage 238 to the lookup table in assignment criteria storage 234. At system shutdown, update manager 240 incorporates any pending entries from pending assignment storage 238 into the table or tables in assignment criteria storage 234 and then saves the table or tables into disk storage. At system startup, update manager 240 reads the file and stores the table contained therein into the table or tables in assignment criteria storage 234, and then installs the remainder of the drivers 220-221 to allow them to begin operating.

In embodiments in which there are multiple lookup tables in assignment criteria storage 234, update manager 240 may add the information from the entries in pending assignment storage 238 into all of the tables, or some of the tables, or may add one version into one or more tables and another version into one or more different tables (e.g. adding different preference values for each table to be used by the driver 220-221 running on the processor 250-251 corresponding to the queue to which the communication should be assigned so that communication assigner 222 need not use the type of the assignment to determine the preference as described above.

In another embodiment, entries from the queue corresponding to the driver (or the queues for the processes that provide information to that driver) in pending assignment storage 238 are incorporated into assignment criteria storage 234, during the operation of that driver. In such embodiment, after communication assigner 222 completes the assignment of a communication as described herein, it signals incorporation manager 224, which scans just the pending assignment queue or queues in pending assignment storage 238 which contains criteria and other information received from processes of the processor on which incorporation manager 224 is being executed, and updates in assignment criteria storage 234 the lookup table or tables used by all drivers 220-221 that share a communication resource with the driver containing that incorporation manager 224, before returning program control to the processor 250-251. Although this process only updates assignment criteria storage 234 with information from a single processor 250-251, as the other drivers 220-221 assign communications, they will use their pending assignment criteria queues to update the table or tables. Because only one driver 220-221 of the drivers that share a communication resource operates at any given time, contention for the table or tables in assignment criteria storage 234 used by those drivers is avoided, eliminating the need for a locking mechanism to prevent simultaneous access to the table or tables in assignment criteria storage 234. If the processor 250-251 will prioritize the driver ahead of any processes that operate on that processor 250-251, interference involving the pending criteria queues is eliminated, and thus, using this embodiment, updates may occur more frequently than would otherwise be possible if system initialization and periodic updates were the only time the pending criteria were applied to the table or tables.

Processes Retrieve Communications from an Operating System or Directly from a Queue, Bypassing the Operating System.

As described herein, the assignment of communications to processors, processes or types of communications for a processor are made without use of the operating system of the multiprocessor computer system.

In one embodiment, communications are assigned to processor queues as described above. In such embodiment, the operating system (not shown) running on each processor reads the processor queue and provides communications to processes 252-258 as if the processor queue was the queue from the communication interface 210. In such embodiment, communication assigner 222 can provide a software interrupt to the processor corresponding to the processor to which the communication was assigned, to simulate a communication interface providing such interrupt. In such embodiment, processes 252-258 request communications using conventional operating system calls such as socket calls, and the operating system may process them with little or no change to the code for processing communications received from a communication interface 210 in the conventional manner.

In another embodiment, each process 252-258 may retrieve communications corresponding to the pointers in the various queues in queue storage 236. A process 252-258 may retrieve a communication corresponding to a pointer in a queue corresponding to that process 252-258, without employing a locking capability because no other process will retrieve communications from that queue. A process 252-258 may retrieve a communication corresponding to a pointer in a queue corresponding to the processor 250-251 on which the process 252-258 runs. A process 252-258 may retrieve a communication corresponding to a pointer in a queue corresponding to the processor 250-251 on which the process 252-258 runs that also corresponds to a type of communication processed by that process. A locking mechanism may be used for the last two techniques, or a separate process may handle providing pointers to the communication from each such queue using queued requests for communications. A process 252-258 may retrieve a communication from any combination of the above, in other embodiments of the present invention. This arrangement can bypass the operating system (not shown) under which each of the processes 252-258 run, to receive and to provide communications to the processes 252-258.

No Locking Required.

Because communication interface 210 provides only a single interrupt at a time, and each driver 220-221 has control of the processor 250-251 on which it resides during the time it is responding to the interrupt, there is no contention for the criteria in assignment criteria storage 234, and if internally stored functions are used in the communication assigners 222, contention for the criteria is eliminated. Because only one communication resource device interrupt will be processed at a time, contention among drivers for the queues in queue storage 236 is avoided as well.

Furthermore, because the processes 252-258 (or operating system) retrieve pointers to communications from the head of the queues in queue storage 236, and each driver 220-221 adds pointers to communications to the end of the queues in queue storage 236, there is no contention for the pointers to the queues in queue storage 236, other than a check, using the end of the queue, that the processes 252-258 make to verify that the queue is not empty. If, when a communication pointer is added to the end of a queue, the end of the queue pointer is updated after the pointer to the communication is written to the queue, and the end of queue pointer is not greater than a single data word, the memory bus contention controls will accommodate the contention issues between the drivers 250-251 and the processes 252-258 and eliminate the need for a locking mechanism dedicated to preventing contention for the queues in queue storage 236.

If there are multiple communication interfaces 210, 214 supplying communications to the various drivers 220-221, 214, if all of the communication interfaces 210-214 share a single interrupt, conventional interrupt contention controls will accommodate the contention issues.

Alternatively, the communication interfaces 210, 214 may be divided into pools of one or more communication interfaces 210, 214 (each pool referred to as a "communication resource") and each communication resource may share an interrupt, which is serviced by a set of one or more drivers. In one such embodiment, the drivers in the set assign communications in such a manner that they may only be processed by processes 252-258 operating on processors on which the drivers in the set execute.

Thus, unless otherwise noted, the present invention may operate to provide communications without the use of a locking mechanism that is specific to the queues in queue storage 236 or the lookup table or tables in assignment criteria storage 234. A locking mechanism is a mechanism in which processes and/or drivers check the availability of a shared resource such as queues or other memory resources before using it to ensure that it is not being used by another process and/or driver. In the circumstance in which a locking mechanism indicates the shared resource is in use, the process or driver that checked the availability of the shared resource may have to sit idle and check it again, wasting processor cycles. Even if the shared resource is available, the requirement that the locking mechanism be checked each time can use significant processing resources not required by various embodiments of the present invention, which does not employ such a locking mechanism.

As such, communications are stored, assigned and provided to processes or queues by the present invention "sinelockingly", which means "without the use of a locking mechanism that is dedicated to the use of storage, and/or the assignment, and/or the providing, of communications received by a computer system". The memory bus contention mechanisms and interrupt contention mechanisms used as described above do not affect whether a communication is stored, assigned or provided to processes sinelockingly because they are not dedicated to such use: they have other uses.

A Process may be Rescheduled on a Processor in Response to a Communication Received.

In one embodiment, the criteria in criteria storage may indicate that a communication meeting the criteria should only be assigned to a process 252-258 that will execute on the processor 250-251 on which the driver 220-221 assigning the communication operates.

In such embodiment, before making any assignment, but after communication assigner 222 selects an entry in the table to use to assign the communication as described above, communication assigner 222 checks to see if the table entry in assignment criteria storage 234 that it uses to select the identifier of a queue as described above indicates that a process should be running on the same processor as that communication assigner 222. Such information may be provided via any of the techniques described above.

If the table entry so indicates, communication assigner 222 checks to determine whether the process is scheduled for operation on the same processor as the driver making the assignment. If not, communication assigner 222 instructs the operating system to reschedule the process onto that processor, and the operating system will reschedule that process at the next available opportunity.

In one embodiment, a scheduled process is referred to by the name of the process or by the memory location in which the first instruction in the process is stored. In such embodiment, the process (or operating system) that provides the criteria and the queue identifier for the table in assignment criteria storage 234 as described above provides the identifier of the process as part of the table row. At startup, update manager 240 provides each communication assigner 222 the identifier of the processor 250-251 on which it operates to allow communication assigner 222 to determine whether a process is running on that processor 250-251.

To verify whether the identified process is scheduled to run on the same processor as runs the driver assigning the communication, communication assigner 222 requests from the operating system (not shown) a table of identifiers of scheduled processes and the identifier of the processor 250-251 on which each such process is running or scheduled to run. For example, on the conventional Linux operating system, the conventional sys_sched_setaffinity( ) API or top command is used to obtain such information. Communication assigner 222 checks to see whether the requisite process is scheduled to run on the same processor as communication assigner 222 and if not, communication assigner provides a command to the operating system (not shown) to reschedule the process on that processor. For example, under the conventional Linux operating system, the conventional schedule( ) function may be used to reschedule a process and under the conventional Solaris operating system, the processor_bind( ) function may be used to reschedule a process. In one embodiment, if the process having the name specified in the table entry is not running, communication assigner 222 requests the operating system to start the process on the same processor on which communication assigner 222 is operating.

Communication assigner 222 then makes the assignment as described above. When the process processes the communication, the communication will be in the processor cache due to the operation of communication assigner.

Process may be Rescheduled when it Requests a Communication

In another embodiment, the above rescheduling procedure does not occur as part of the assignment process in driver 220-221, but instead, may occur when the process 252-258 provides a request for a communication, or provides a particular type of request, that allows rescheduling, for a communication. In one embodiment, the process may, as part of a subsequent request or otherwise, ensure that it is not rescheduled to a different processor until it has completed processing similar subsequent communications (e.g. having the same source IP address and port, destination IP address and port and protocol) as the first communication. Similar, subsequent communications may be assigned to the same processor 250-251 as was the first communication due to the assignment process described above, and therefore, no further rescheduling of the process is required. The process 252-258 may also place itself to sleep, but request that similar subsequent communications cause it to be woken up and a similar subsequent communication provided to it.

Figure 2B:
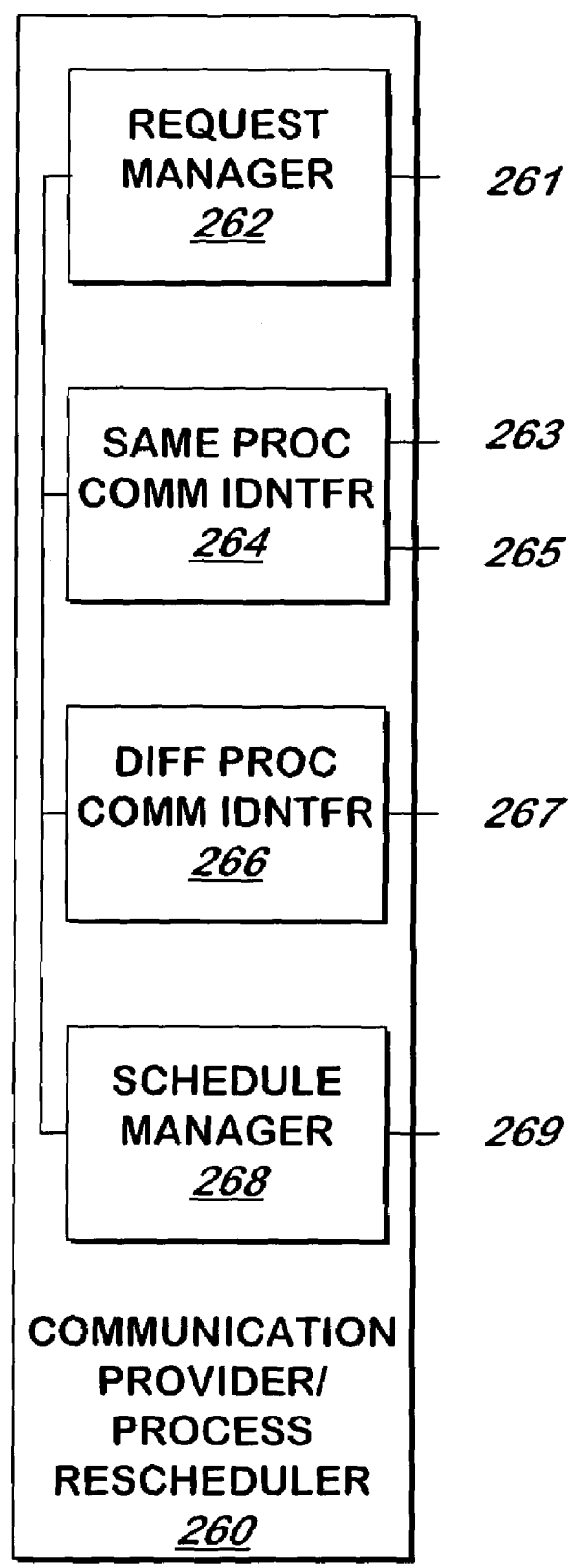
FIG. 2B is a block schematic diagram of a system for providing communications to processes that may be rescheduled to execute on the processor that assigned the communication according to one embodiment of the present invention.

FIG. 2B illustrates a block schematic diagram of a system 260 for providing communications to processes that may be rescheduled to execute on the processor that assigned the communication according to one embodiment of the present invention. Referring now to FIGS. 2A and 2B, the system 260 is referred to as a communication provider/process rescheduler 260. Communication provider/process rescheduler 260 may be included as part of the operating system routines that handle requests for communications from processes 252-258, as a separate process 252-258 that provides communications in response to requests from one or more other processes 252-258. There may be one communication provider/process rescheduler 260 per processor 250-251, or more or less than one communication provider/process rescheduler 260 per processor 250-251. As described herein, there is one communication provider/process rescheduler 260 per processor 250-251 and each communication provider/process rescheduler 260 is part of the operating system running on that processor 250-251.

Request manager 262 receives via input/output 261 requests from processes 252-258. The request may be a request for a communication, or it may be a request to monitor communications received and awaken the process if such a communication is received. The request may specify whether the process 252-258 from which the request was received may be rescheduled to run on a different processor 250-251 as described herein, or request manager 262 may identify that such rescheduling may take place by comparing the process identifier of the process 252-258 from which the request was received with an internally-stored list of processes that may be rescheduled that request manager 262 maintains in response to commands from processes 252-258 requesting that they be added to the list. In one embodiment, an identifier of the process, such as the starting memory location of the source code of the process, a process name, or other identifier, is received with the request.

If the request is a request for a communication, request manager 262 provides the process identifier and the criteria specified in the request to same processor communication identifier 264. Same processor communication identifier 264 identifies if a communication has been received for the same processor as the process from which the request was received. In one embodiment, the processor will be the same as the processor on which same processor communication identifier 264 operates, in which case it may identify and store identifiers of the one or more queues corresponding to that processor upon system startup, for example, by receiving such identifiers from update manager 240. For example, if processor queues are in use, the request may specify a communication having a particular port, and same processor communication identifier 264 scans the process queue for the process 250-251 on which the requesting process 252-258 is scheduled to run for communications having that port. If type queues are in use, the request may specify a particular type and same processor communication identifier 264 scans the type queue for the identified processor 250-251 for any communications, or for communications meeting additional criteria specified in the request.

If same processor communication identifier 264 locates such a communication, it retrieves the pointer to it from the queue, and provides it to request manager 262, which provides it to the requesting process via input/output 261. If no such communication is available, same process communication identifier 264 so indicates to request manager 262.

Request manager 262 then identifies if the process is available to be rescheduled as described above. If not, request manger 262 indicates to the requesting process via input/output 261 that no such communication is available. If the requesting process is available to be rescheduled as described above, it provides the request to different processor communication identifier 266.

Different processor communication identifier 266 provides the request to the request managers 262 running on other processors 250-251, using a form of the request that is identifiable as a cross processor request. The request managers 262 in the other processors will, with their respective same processor communication identifiers 264 (i.e. in the same communication provider/process rescheduler 260), attempt to locate communications corresponding to the criteria on those processors as described above, and if found, each request manager 262 will notify different processor communication identifier 266 that it has located such a communication or that it does not have one, and will include an identifier of the communication provider/process rescheduler 260 or the processor 260 on which that communication provider/process rescheduler 260 operates, with its response. Although different processor communication identifier 266 may check each queue for the other processors itself, doing so via other systems 260 executing on the processor for which the communication was scheduled can improve the chance that the communication is in that processor's cache, thus speeding the location of the communication.

Different processor communication identifier 266 receives the responses and selects one such processor 250-251 and provides a request to the request manager 262 in the selected communication provider/process rescheduler 260 that the pointer to the communication be removed from the queue and returned to different processor communication identifier 266. If the a communication meeting the criteria of the request is still available, the request manager 262 in the selected communication provider/process rescheduler 260 on the other processor 250-251 will retrieve the pointer to communication from the queue and provide the pointer and identifier of the processor 250, 251 on which it is running to different processor communication identifier 266 that provided the request. Different process communication identifier 266 provides the pointer of the communication and an identifier of the processor on which the request manager 262 that provided the pointer is operating. If no such communication is available, that request manager 262 so indicates and different processor communication identifier 266 repeats the process of locating such a communication as described above.

Request manager 262 then signals schedule manager 268 with the identifier of the processor received from different processor communication identifier 266 and the identifier of the process, and indicates that the process is to be rescheduled. Schedule manager 268 reschedules the requesting process 252-258 onto the indicated processor 250-251 as described above and signals request manager 262, which provides a pointer to the communication to the process, for example, via a memory location specified in the request.

The process 252-258 will then execute on the new processor 250-251 at the next opportunity of the scheduler to execute it, and the communication may still be in the processor cache of that processor 250-251. If no such communications are available on any of the other processors, different processor communication identifier 266 so indicates to request manager 262, which so indicates to the requesting process 252-258.

When the process 252-258 receives an indication that no communication corresponding to the request is available as described above, the requesting process 252-258 may provide another request, or may provide to request manager another request with an indication that the process 252-258 wishes to be awoken upon the receipt of a communication meeting the criteria specified in the other request. If so, request manager 262 signals schedule manager 268 to schedule the process to sleep via the operating system or the remainder of the operating system (or the process 252-258 may separately indicate to the operating system) and provides the request and processor identifier to same processor communication identifier 264 with an indication to monitor for such communications. For example, for the LINUX operating system, "sleep_on( )" or "wait_event( )" may be used, for the SOLARIS operating system, "cv_wait( )" may be used, and for the FREEBSD operating system, "tsleep( )" may be used, to schedule the process to sleep.

Same processor communication identifier 264 internally stores the request and periodically checks the one or more queues for the processor 250-251 on which that communication provider/process rescheduler 260 runs for communications corresponding to the request as described above. If such a communication is located, same processor communication identifier 264 retrieves it from the queue and provides a pointer to the communication to request manager 262, along with the request and the process identifier and an indication that a monitored communication has been located.

Request manager 262 provides the process identifier to schedule manager 268 with an indication to wake the process, and schedule manager 268 schedules the process to be woken. For example, for the LINUX operating system, "wake_up( )" may be used, for the FREEBSD operating system, "wakeup( )" may be used, and for the SOLARIS operating system, "cv_signal( )" may be used, to wake a process. Request manager 262 supplies the pointer of the communication to the requesting process 252-258 as described above. The process 252-258 may then process the communication and provide either of the different types of requests as described above.

Methods

Figure 3:
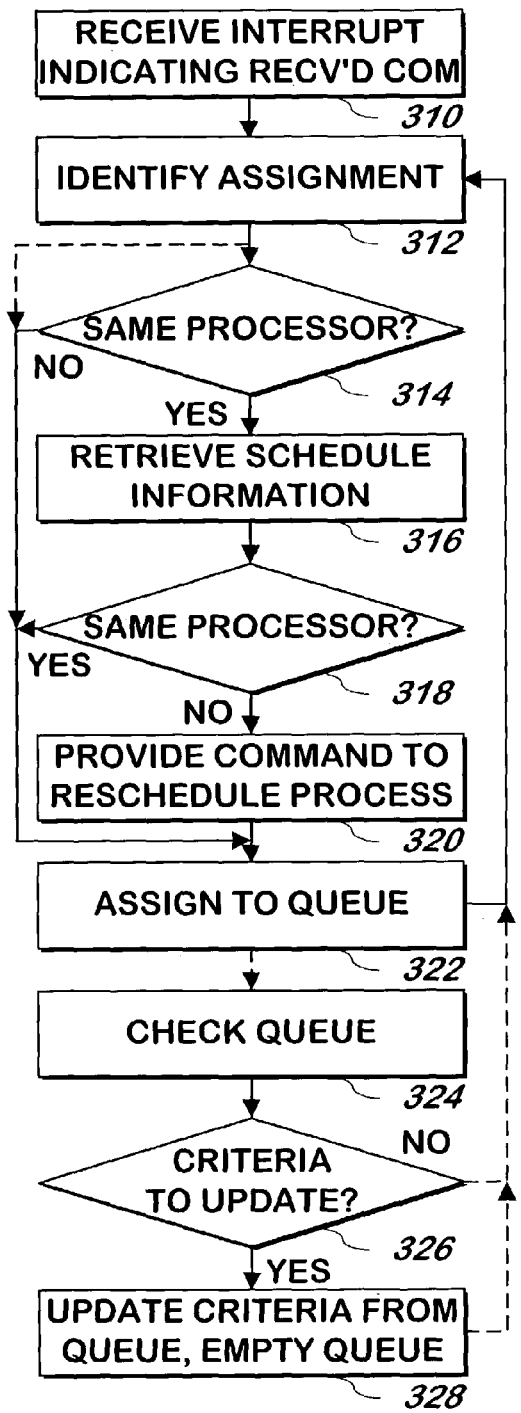
FIG. 3 is a flowchart illustrating a method of assigning communications in a multiprocessor system according to one embodiment of the present invention.

Referring now to FIG. 3, a method of assigning communications received is shown according to one embodiment of the present invention. Control is transferred in response to an interrupt received as described above 310.

An assignment is identified 312 from some or all of the communication as described above. The assignment may be identified using a calculation, or using a lookup table as described above to identify the entity or queue (corresponding to a process, processor or type of communication to be processed by a processor) to which the communication should be assigned.

In one embodiment, if the assignment is to be made to the same processor as the processor executing the method of FIG. 3 (or the assignment is to be made to a process running on that processor or to a type of communications to be processed on that processor) 314, scheduler information is retrieved 316 and if a process corresponding to the assignment of such a communication is not running or not scheduled to run on that processor 318, a command is provided to start or reschedule the process to run on such processor 320 and the method continues at step 322. If such a process is running on the specified processor 318, the method continues at step 322.

In another embodiment, illustrated by the dashed lines in the figure, steps 314-320 are not performed: step 322 follows step 312. This embodiment may be used either if rescheduling is not provided, or if a process is rescheduled upon a request for the communication, described in FIG. 6.

At step 322, the assignment identified in step 312 is made to a queue corresponding to a processor, process or type of communication on a processor and the method continues at step 310. Step 322 may include providing an interrupt to the processor corresponding to the queue to which the communication was assigned and other actions to simulate receipt of the communication for processing in a conventional fashion as described above.

In one embodiment, illustrated by the dashed lines in the Figure, instead of continuing at step 310, after step 322, a pending assignment criteria queue for the processor on which the method of FIG. 3 is being executed is checked 324. If there are pending assignment criteria in that queue 326, the criteria in that queue are applied to the criteria used to assign communications, the queue is set to empty 328 and the method continues at step 310.

Figure 4:
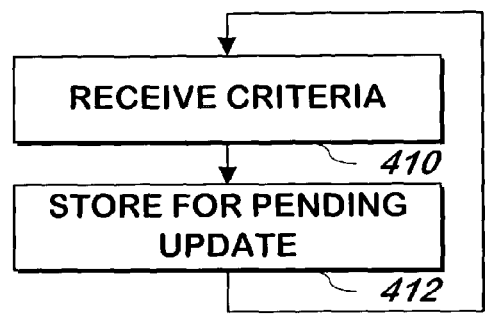
FIG. 4 is a flowchart illustrating a method of receiving criteria for communications from processes according to one embodiment of the present invention.

Referring now to FIG. 4, a method of receiving criteria from a process describing communications it can process is shown according to one embodiment of the present invention. The criteria, and an indication of the process or processor or a type to which communications meeting the criteria should be assigned is received 410. The information received in step 410 may include an indication that the process should be rescheduled for the processor on which the driver assigning the communication is operating, as described above. The criteria and other information are stored 412 into a pending assignment criteria queue or other storage device, awaiting incorporation into a set of criteria. Storage may be performed by converting the information received into one or more table entries as described above, including adding a preference value to the table entry for each such criteria for use as described above.

Figure 5:
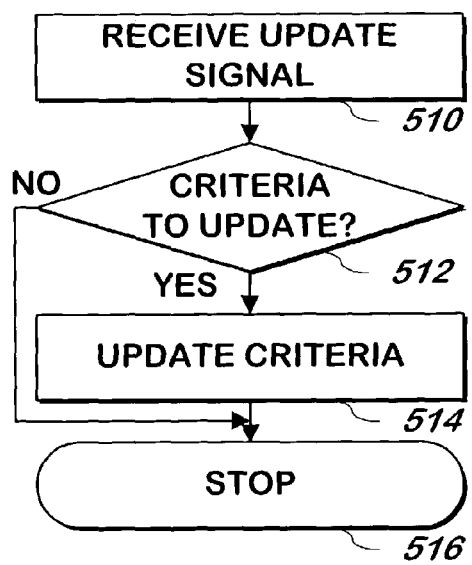
FIG. 5 is a flowchart illustrating a method of incorporating criteria received from processes into a set of criteria used to assign communications in a multiprocessor system according to one embodiment of the present invention.

Referring now to FIG. 5, a method of incorporating information received from processes into a set of criteria used to assign communications is shown according to one embodiment of the present invention. An update signal is received 510. The update signal may be received as a part of a system initialization or may be periodically performed as described above. If there are pending assignment criteria awaiting incorporation 512, the criteria and related information described above, such as an identifier of the processor, process, or type of communications assigned to a processor, preference information, and whether the assignment should be made to a process running on a processor on which the assignment is being made, are incorporated into the criteria used to assign communications 514 and the method continues at step 516. Otherwise 512, the method continues at step 516. At step 516, the method terminates.

Figure 6:
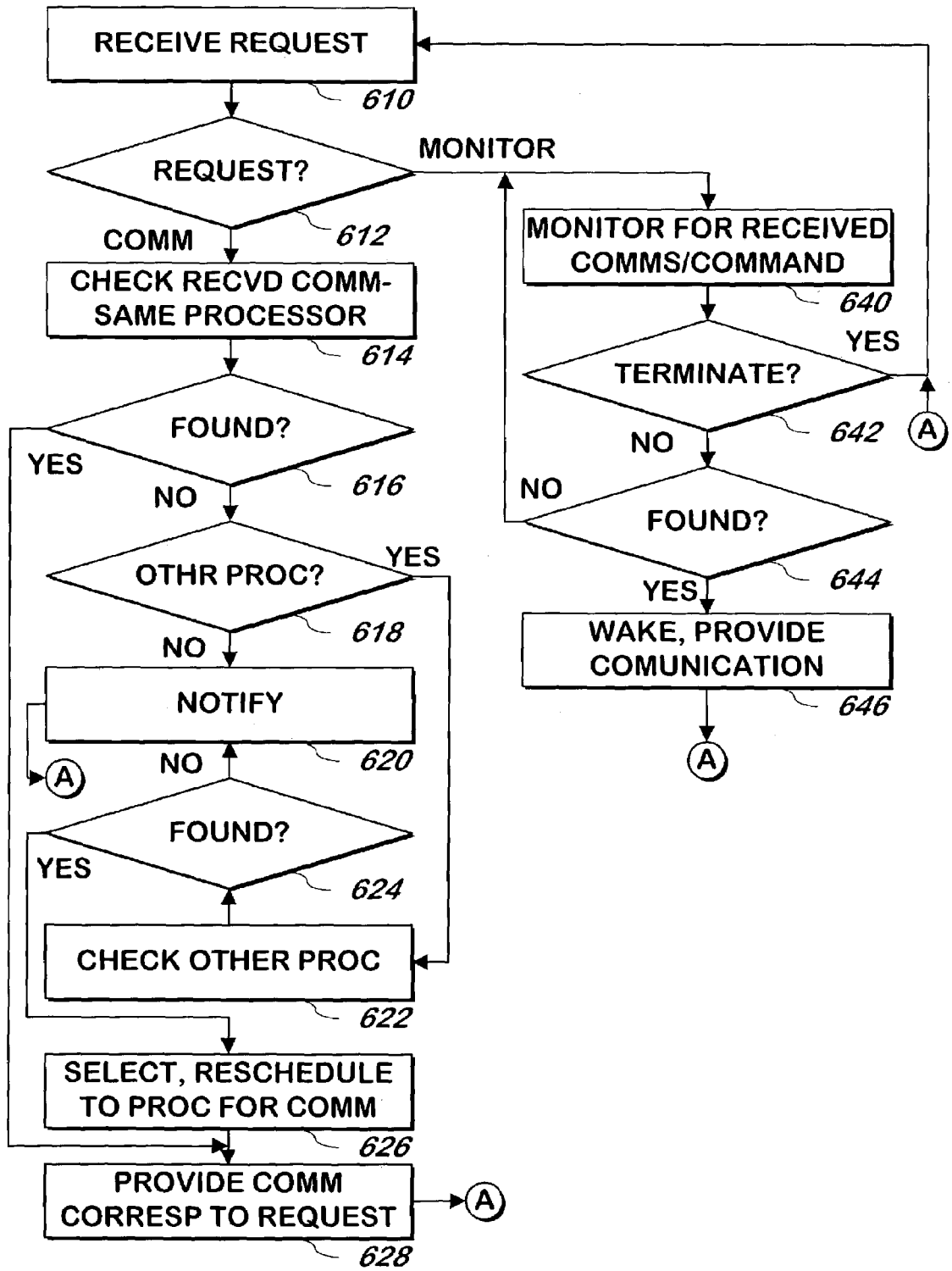
FIG. 6 is a flowchart illustrating a method of providing one or more communications to a process, and optionally rescheduling the process to the processor that assigned the communication, according to one embodiment of the present invention.

Referring now to FIG. 6, a method of providing one or more communications to a process, and optionally rescheduling the process to the processor that assigned the communication, is shown according to one embodiment of the present invention. A request is received 610. The request may contain an identifier of the process from which the request is received as described above. The request may be a request to receive a communication corresponding to criteria specified in the request, or a request to be awoken if such a communication arrives.

If the request is a request for a communication specified in the request 612, the availability of pending communications on the same processor as the requesting process that match any criteria specified in the request is checked 614 and if such communications are found 616, the method continues at step 628. Step 614 may include obtaining the identifier of the processor on which the requesting process is scheduled to run as described above. If a communication is not found on the same processor 616, if the command indicates that the process may be rescheduled or the process identifier corresponds to a process that may be rescheduled 618, the method continues at step 622 and otherwise 618, the requesting process is notified 620 that a communication corresponding to the request is unavailable and the method continues at step 610.

At step 622, the availability of communications pending for other processors (including process or type queues on other processors) that correspond to the request is checked 624 and if such communications are found 624, the method continues at step 626 and otherwise 624, the method continues at step 620.

At step 626, one of the communications found in step 624 is selected and the requesting process is rescheduled for the processor corresponding to the selected communication as described above. The communication is provided to the requesting process 628.

At step 612, if the request received in step 610 is a request to monitor one or more queues on the same processor as the process is currently scheduled and wake the process upon identification that such a communication has been received, one or more queues corresponding to that processor are monitored until a communication corresponding to any criteria specified in the command is found 640, 644 and the requesting process is woken and the communication provided 646 and the method continues at step 610.

A terminate the monitor command may be received during the 640, 644 loop and if such a command is received 642, the method continues at step 610 and otherwise, continues in the loop to step 644.

What is claimed is:

1. A method of rescheduling an assignment of a communication in a computer system that includes a plurality of processors running under the direction of an operating system, the communication being received at a communication interface, the communication interface being coupled to a first buffer for storage of the communication, and each processor being provided with a driver, the method comprising:

upon receiving a request for a communication from a process scheduled to run on a first processor, selecting an entry in the first data structure, the entry being assigned to the first data structure using a first driver;

determining a selected one of the plurality of processors indicated by a criteria associated with the entry;

identifying a second driver associated with the first processor; and if the second driver differs from the first driver, making an operating system call to reschedule the process on one of the plurality of processors corresponding to the first driver.

2. The method of claim 1 wherein the step of receiving the request for a communication further includes a receiving a command from a process requesting to be added to a list of processes to be rescheduled.

3. A method for assigning a communication to one of a plurality of processors in a multiprocessor system, the method comprising the steps of:
- receiving in a pending assignment criteria queue, a criteria and an indication of at least one of a process, a processor or a type to which a communication meeting the criteria is to be assigned;
- from the pending assignment criteria queue, identifying an assignment of the communication to a selected one of the plurality of processors using a first processor to perform the step of identifying;
- if the selected one of the plurality of processors is identical to the first processor, retrieving scheduler information and causing a process corresponding to the assignment to run on the first processor; and
- if the selected one of the plurality of processors is different from the first processor, rescheduling the process to run on the selected one of the plurality of processors.

4. The method of claim 3 wherein the step of rescheduling further comprises:
- receiving a request from a process to monitor the pending assignment criteria queue on the processor on which the process is scheduled for an arrival of a specific communication; and
- waking the process up when the arrival is detected.

* * * * *